F. WALTON.
ROAD VEHICLE SUSPENSION ARRANGEMENT.
APPLICATION FILED SEPT. 9, 1909.
964,589.
Patented July 19, 1910.
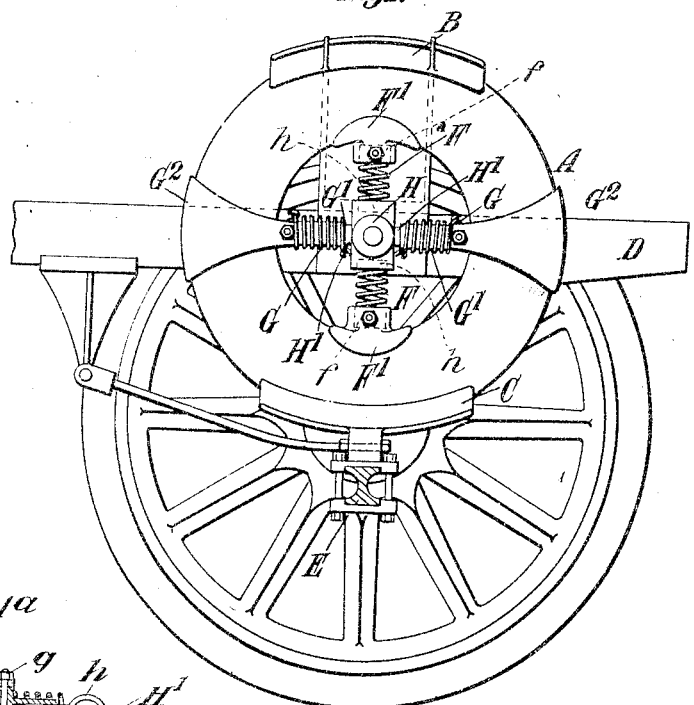
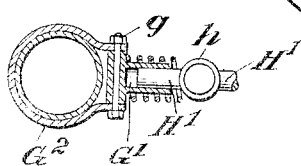
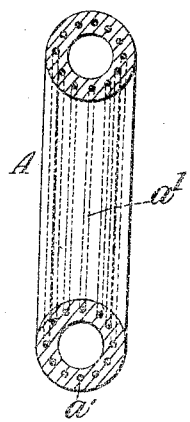
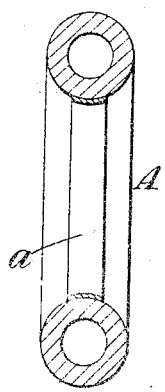
Witnesses:
Inventor:
Frederick Walton

UNITED STATES PATENT OFFICE.

FREDERICK WALTON, OF LONDON, ENGLAND.

ROAD-VEHICLE SUSPENSION ARRANGEMENT.

964,589.  Specification of Letters Patent.  Patented July 19, 1910.

Application filed September 9, 1909. Serial No. 516,966.

*To all whom it may concern:*

Be it known that I, FREDERICK WALTON, a subject of the King of Great Britain, residing at 114 Holborn, in the county of London, England, have invented certain new and useful Improvements in or Relating to Road-Vehicle Suspension Arrangements, of which the following is a specification.

This invention relates to road vehicle suspension arrangements of the kind set forth in the specification of my prior British Patent No. 12978 of 1908, wherein tubular air springs are arranged edgewise to support the weight of the vehicle and are of such a character that they tend to assume an annular or similar shape, the said springs being unsupported at their inner periphery by any rigid connection, so that they are able to change their said shape to a greater or less extent in accordance with the degree of fluid pressure within them or the extent of resiliency possessed by the material of which they are composed and the magnitude of the vibrations and shocks to which they are subjected during the traveling of the vehicle.

According to this invention the said tubular air springs are provided with means for supplementing their resistance to deflection. These means comprise a combination of tension and compression springs which may be arranged to act in the capacity of safety stops, or spring supports, or for supporting the body of the vehicle in the event of the total or partial collapse of the tubular air springs. Or the said means may comprise a resilient hoop or hoops composed of steel, whalebone, or other appropriate material, situated within the inner circumference of the tubular air springs or embedded in the material of which the said springs are made.

In the accompanying drawings:—Figure 1 is a side elevation of a vehicle suspension arrangement provided with a tubular air spring having means for supplementing its resistance in accordance with this invention. Fig. 1ª is a horizontal section of a part of Fig. 1. Figs. 2 and 3 are sections showing modified forms of the means for supplementing the resistance of the tubular air spring.

A represents the tubular air spring, B and C the upper and lower supporting members that are respectively connected to the frame and to the axle of the vehicle, D the vehicle frame and E the axle.

In the arrangement shown in Fig. 1, the spring confining device comprises two compression springs F situated at right angles to two tension springs G, both sets of springs being supported in the annular space within the tubular air spring A. The compression springs are supported at their outer ends in sockets *f* formed in shoes F' arranged to fit the adjacent portions of the tubular air spring A and at their inner ends in sockets *h* formed in a block H. The tension springs G are arranged to encircle sleeves G' connected by bolts *g* to saddle shaped members G² which embrace a portion of the sides and outer circumference of the tubular air spring. The aforesaid sleeves G' are slidably mounted upon pins H' projecting from the opposite sides of the block H to which the inner ends of the springs G are connected, their outer ends being connected to the saddle shaped members G². The device is so arranged in relation to the tubular air spring A that the compression springs F assist in supporting the load, and the tension springs G assist in preventing the tubular air spring A from becoming deflected by the action of the said load, the aforesaid compression springs may also act in the capacity of safety stops, or spring supports, for supporting the body of the vehicle in the event of the total or partial collapse of the tubular air spring A.

In the arrangement shown in Fig. 2, *a* represents a resilient hoop encircling the inner periphery of the tubular air spring A. This hoop may be manufactured of steel or other suitable material which will increase the resistance of the said spring to deflexion or bending movement. If desired a number of steel or other hoops *a'*, Fig. 3, may be embedded in the material of the tubular air spring for effecting the aforesaid increased resistance.

What I claim and desire to secure by Letters Patent of the United States is:—

1. In a vehicle suspension arrangement of the kind described, the combination with an annular tubular air spring of two compression springs, and two tension springs arranged at right angles thereto within the space surrounded by the annular tubular air spring, shoes carried by the compression springs to support the inner peripheral portions of the tubular air spring, and saddle shaped members connected to the tension springs and also with the tubular air spring.

2. In a vehicle suspension arrangement of the kind described, the combination with an annular tubular air spring of two compression springs and two tension springs arranged at right angles thereto within the space surrounded by the annular tubular air spring, a block arranged to support the inner ends of the compression springs and to form a connection with the inner ends of the tension springs, supporting shoes carried by the outer ends of the compression springs and saddle shaped members connected to the outer ends of the tension springs and also to the tubular air-spring.

3. In a vehicle suspension arrangement of the kind described, the combination with an annular tubular air spring of two vertically arranged compression springs and two horizontally arranged tension springs situated within the space surrounded by the tubular air spring, a block formed with pockets to receive the inner ends of the compression springs and provided with connecting devices for attachment to the inner ends of the tension springs, horizontal pins projecting from two opposite sides of such block supporting shoes carried by the outer ends of the compression springs and saddle-shaped members connected to the outer ends of the tension springs and arranged to embrace a portion of the sides and outer circumference of the tubular air spring, sleeves projecting inwardly from the saddle-shaped members and arranged to be encircled by the tension springs and to slide upon the aforesaid horizontal pins.

In testimony whereof I affix my signature in presence of two witnesses.

FREDERICK WALTON.

Witnesses:
T. SELBY WARDLE,
F. J. RAPSON.